United States Patent
Akel et al.

(10) Patent No.: US 12,242,388 B2
(45) Date of Patent: Mar. 4, 2025

(54) ROW HAMMER MITIGATION USING A VICTIM CACHE

(71) Applicant: Micron Technology, Inc., Boise, ID (US)

(72) Inventors: Ameen D. Akel, Rancho Cordova, CA (US); Shivam Swami, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/945,702

(22) Filed: Sep. 15, 2022

(65) Prior Publication Data

US 2023/0393992 A1     Dec. 7, 2023

Related U.S. Application Data

(60) Provisional application No. 63/348,459, filed on Jun. 2, 2022.

(51) Int. Cl.
| | |
|---|---|
| *G06F 12/12* | (2016.01) |
| *G06F 12/0864* | (2016.01) |
| *G06F 12/0884* | (2016.01) |
| *G06F 12/122* | (2016.01) |

(52) U.S. Cl.
CPC ........ *G06F 12/122* (2013.01); *G06F 12/0864* (2013.01); *G06F 12/0884* (2013.01)

(58) Field of Classification Search
CPC .................................................. G06F 12/123
See application file for complete search history.

(56) References Cited

U.S. PATENT DOCUMENTS

| | | | | |
|---|---|---|---|---|
| 5,261,066 A | * | 11/1993 | Jouppi | G06F 12/0862 711/128 |
| 5,944,815 A | * | 8/1999 | Witt | G06F 9/383 711/E12.07 |
| 6,199,142 B1 | * | 3/2001 | Saulsbury | G06F 12/0893 711/123 |
| 6,223,256 B1 | * | 4/2001 | Gaither | G06F 12/127 711/134 |
| 6,397,296 B1 | * | 5/2002 | Werner | G06F 9/3814 711/119 |
| 6,718,439 B1 | * | 4/2004 | Jayavant | G06F 12/0864 711/E12.043 |
| 8,327,072 B2 | * | 12/2012 | Guthrie | G06F 12/127 711/E12.043 |
| 9,747,971 B2 | | 8/2017 | Bains et al. | |
| 9,792,963 B2 | | 10/2017 | Damle et al. | |
| 2007/0239938 A1 | * | 10/2007 | Pong | G06F 12/0895 711/E12.043 |
| 2014/0006703 A1 | | 1/2014 | Bains et al. | |
| 2015/0052309 A1 | * | 2/2015 | Philip | G06F 12/082 711/128 |

(Continued)

OTHER PUBLICATIONS

Birhanu ANVIL Software Based Protection Against Row Hammer 2016.*

(Continued)

*Primary Examiner* — Paul M Knight
(74) *Attorney, Agent, or Firm* — Brooks, Cameron & Huebsch, PLLC (57) ABSTRACT

Row hammer attacks takes advantage of unintended and undesirable side effects of memory devices in which memory cells interact electrically between themselves by leaking their charges and possibly changing the contents of nearby memory rows that were not addressed in an original memory access. Row hammer attacks are mitigated by using a victim cache. Data is written to cache lines of a cache. A least recently used cache line of the cache is written to the victim cache.

20 Claims, 4 Drawing Sheets

(56) References Cited

U.S. PATENT DOCUMENTS

| | | | |
|---|---|---|---|
| 2016/0224262 A1 | 8/2016 | Mandava et al. | |
| 2017/0031831 A1* | 2/2017 | Bohra | G06F 12/0871 |
| 2020/0012600 A1* | 1/2020 | Konoth | G06F 11/1068 |
| 2020/0371964 A1* | 11/2020 | Bhoria | G06F 12/121 |
| 2021/0064787 A1* | 3/2021 | Saileshwar | G06F 21/54 |
| 2021/0081575 A1* | 3/2021 | Saileshwar | G06F 8/41 |
| 2023/0079210 A1* | 3/2023 | Klimov | G06F 12/0877 |
| | | | 711/118 |
| 2023/0350814 A1* | 11/2023 | Unterluggauer | G06F 12/0811 |

OTHER PUBLICATIONS

Chaudhuri Pseudo LIFO 2009.*
Hilson CXL Protocol Adds Capabilities over PCIe 2020.*
Jouppi Improving Direct Mapped Cache Performance 1990.*
Konoth ZebRAM 2018.*
Lipp Take A Way Exploring the Security Implications Way Predictors 2020.*
Lou Understanding Rowhammer Attacks Unified Reference Framework 2019.*
Mann How CXL may change the datacenter as we know it May 2022.*
Seaborn Exploiting the DRAM rowhammer bug 2015.*
Tobah SpecHammer Combining Spectre and Rowhammer May 2022.*
Yan Attack Directories Not Caches 2019.*
Smith_A Study of Instruction Cache Organizations 1983.*
NPL Ridder SMASH 2021.*
NPL Saileshwar Randomized Row Swap Mar. 2022.*
NPL Zhang PThammer 2020.*

* cited by examiner

“ROW HAMMER MITIGATION USING A VICTIM CACHE”

PRIORITY INFORMATION

This application claims priority to U.S. Provisional Application Ser. No. 63/348,459, filed on Jun. 2, 2022, the contents of which are incorporated herein by reference.

TECHNICAL FIELD

The present disclosure relates generally to semiconductor memory and methods, and more particularly, to apparatuses, systems, and methods for row hammer mitigation using a victim cache.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to row hammer mitigation using a victim cache are described. In one example, a method for row hammer mitigation using a victim cache includes writing data to cache lines of a first cache and writing a least recently used cache line from the first cache to a cache line of a second cache. As described in more detail herein, writing the least recently used cache line from the first cache to the second cache can be performed as part of a row hammer mitigation operation.

Row hammer attacks generally refer to security exploits that take advantage of an unintended and undesirable side effect in which memory cells interact electrically between themselves by leaking their charges, possibly changing the contents of nearby memory rows that were not addressed in the original memory access. As memory devices trend toward the inclusion of increased density integrated circuits and the inclusion of physically smaller memory cells that can contain less charge than previous generations of memory devices, lower operational noise margins, increased rates of electromagnetic interactions between memory cells, and greater possibility of data loss can result. Accordingly, strategies to detect, prevent, and/or correct adverse effects associated with row hammer attacks have become increasingly important.

Some approaches attempt to mitigate row hammer attacks by refreshing memory cells at a higher rate than traditionally used (e.g., by using a refresh rate that is less than 64 milliseconds (ms)). However, such approaches tend to result in higher power consumption and increased processing overhead than approaches that do not alter the refresh rate of the memory cells.

Other approaches may implement counter-based identification of frequently accessed memory rows and seek to proactively refresh neighboring rows based on the value of the counter indicating that a potential row hammer attacks is transpiring. Although such approaches generally do not suffer from the power consumption and increased processing overhead that are inherent in the more simplistic approaches describe above, additional circuitry can be needed to increment the counter, store the counter, and/or analyze the counter to determine whether or not to proactively refresh the neighboring rows.

In order to address these and other deficiencies, embodiments herein are directed to the addition of a second cache (e.g., a "victim cache") to which entries from a first cache are written subsequent to being written to the first cache. In some embodiments, the first cache and/or the second cache operate according to a least recently used (LRU) caching policy in which the least recently used cache line from the first cache and/or the second cache is evicted first, a second least recently used cache line from the first cache and/or the second cache is evicted second, and so on and so forth. As used herein, a "least recently used cache line" generally refers to a cache line (e.g., the set of cells or addressed) in a cache for which, relative to other portions of the cache, the longest time period has elapsed since that cache line has been accessed, read from, or written or the like. The least recently used cache line may thus be the cache line within a cache or portion of the cache that has maintained the same state for the longest time period or duration relative to other cache lines in the cache or portion of the cache.

By evicting cache lines from the first cache to the second cache according to an LRU caching policy, an amount of time that any given cache line is stored is increased thereby reducing the frequency at which the cache lines can be accessed (e.g., "thrashed") in attempting to perform a row hammer attack. This can, in turn, mitigate the efficacy of an attempted row hammer attack without altering the refresh rate of the memory cells and/or in the absence of utilizing counters to determine access frequency of cache lines in the first cache and/or the second cache.

In addition, embodiments herein can further allow for a latency associated with the first cache and/or the second cache to be matched to the latency of a channel coupling a memory device to the first cache and/or the second cache. For example, the latency associated with the first cache and/or the second cache may be much smaller than the latency associated with the channel coupling the memory device to the first cache and/or the second cache. Therefore, by matching the latency of the first cache and/or the second cache to the latency associated with the channel coupling the memory device to the first cache and/or the second cache, the amount of time that any given cache line is stored is increased thereby reducing the frequency at which the cache lines can be "thrashed" in attempting to perform a row hammer attack.

Further, embodiments herein allow for operations to be performed to mitigate row hammer attacks in the absence of commands and/or signaling from circuitry external to the first cache and/or the second cache, or, at minimum, in the absence of commands and/or signaling from circuitry external to a controller (e.g., a central controller) on which the first cache and/or the second cache are deployed. This can allow for eliminating a need for detection of a row hammer attack in order to mitigate the row hammer attack, in contrast to other approaches. In addition, this can reduce the amount of data traffic (e.g., signal and/or command traffic) inherent to some approaches to row hammer attack mitigation, thereby improving the overall function of a computing device in which embodiments of the present disclosure operate.

In some embodiments, the first cache and/or the second cache can be resident on a memory controller deployed in a memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

As used herein, the term "resident on" refers to something that is physically located on a particular component. For example, the first cache and/or the second cache being "resident on" the memory controller refers to a condition in which the hardware circuitry that comprises the first cache and/or the second cache is physically located on the memory controller. The term "resident on" can be used interchangeably with other terms such as "deployed on" or "located on," herein.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface. As will be appreciated, interfaces described herein that operate according to the CXL protocol can allow for data transfer rates of at least 32 gigatransfers per second between certain components of the memory systems described herein.

Figure 1:
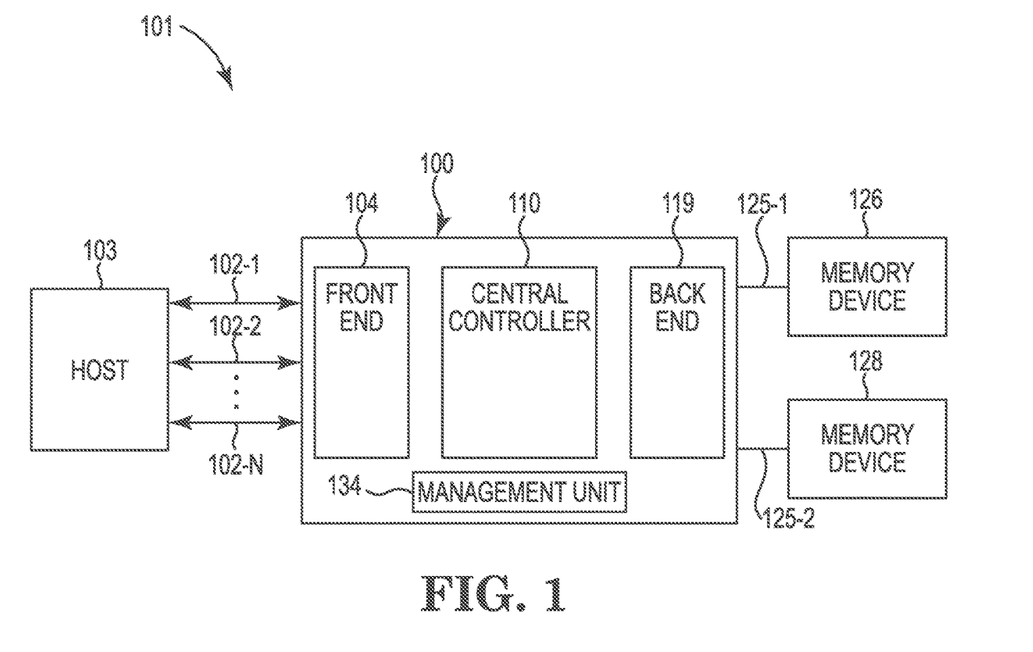
FIG. 1 illustrates a functional block diagram in the form of a computing system including a controller for row hammer mitigation using a victim cache in accordance with a number of embodiments of the present disclosure.

FIG. 1 illustrates a functional block diagram in the form of a computing system 101 including a controller 100 for row hammer mitigation using a victim cache in accordance with a number of embodiments of the present disclosure. The computing system 101 can include a memory controller 100 comprising a front end portion 104, a central controller portion 110, and a back end portion 119. The computing system 101 can include a host 103 and memory devices 126, 128.

In some embodiments, the memory controller 100 can manage a non-volatile memory device. For example, the memory device 126 and/or the memory device 128 can be a non-volatile (e.g., persistent) memory device. One example of a non-volatile memory device is a NOT-AND (NAND) memory device (also known as flash technology). A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Other examples of non-volatile memory devices include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs), among others.

Embodiments are not so limited; however, and in some embodiments the memory controller 100 can manage a DRAM memory device 126 having a first tRAS and a FeRAM memory device 128 having a second tRAS. In some embodiments, the tRAS of the FeRAM memory device 128 is different from tRAS of the DRAM memory device. In some embodiments, the DRAM memory device may include other characteristics that differ from the FeRAM memory device. For example, the DRAM memory device and the FeRAM memory device differ in an amount of memory banks, a type of command encoding, a refresh command, a refresh timing, or a combination thereof. Further, in some embodiments, instead of managing both a DRAM memory device 126 and a FeRAM memory device 128, the memory controller 100 can be configured to manage either just DRAM memory devices 126 or just FeRAM memory devices 128.

The memory controller 100 can have a front end portion 104 that includes an interface to couple the memory controller 100 to the host 103 through input/output (I/O) lanes 102-1, 102-2, . . . , 102-N (individually or collectively referred to as I/O lanes 102) and circuitry to manage the I/O lanes 102. In some embodiments, there can be eight I/O lanes 102 and in other embodiments there can be sixteen (16) I/O lanes 102. In some embodiments, the plurality of I/O lanes 102 can be configured as a single port.

The memory controller 101 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously.

Figure 2:
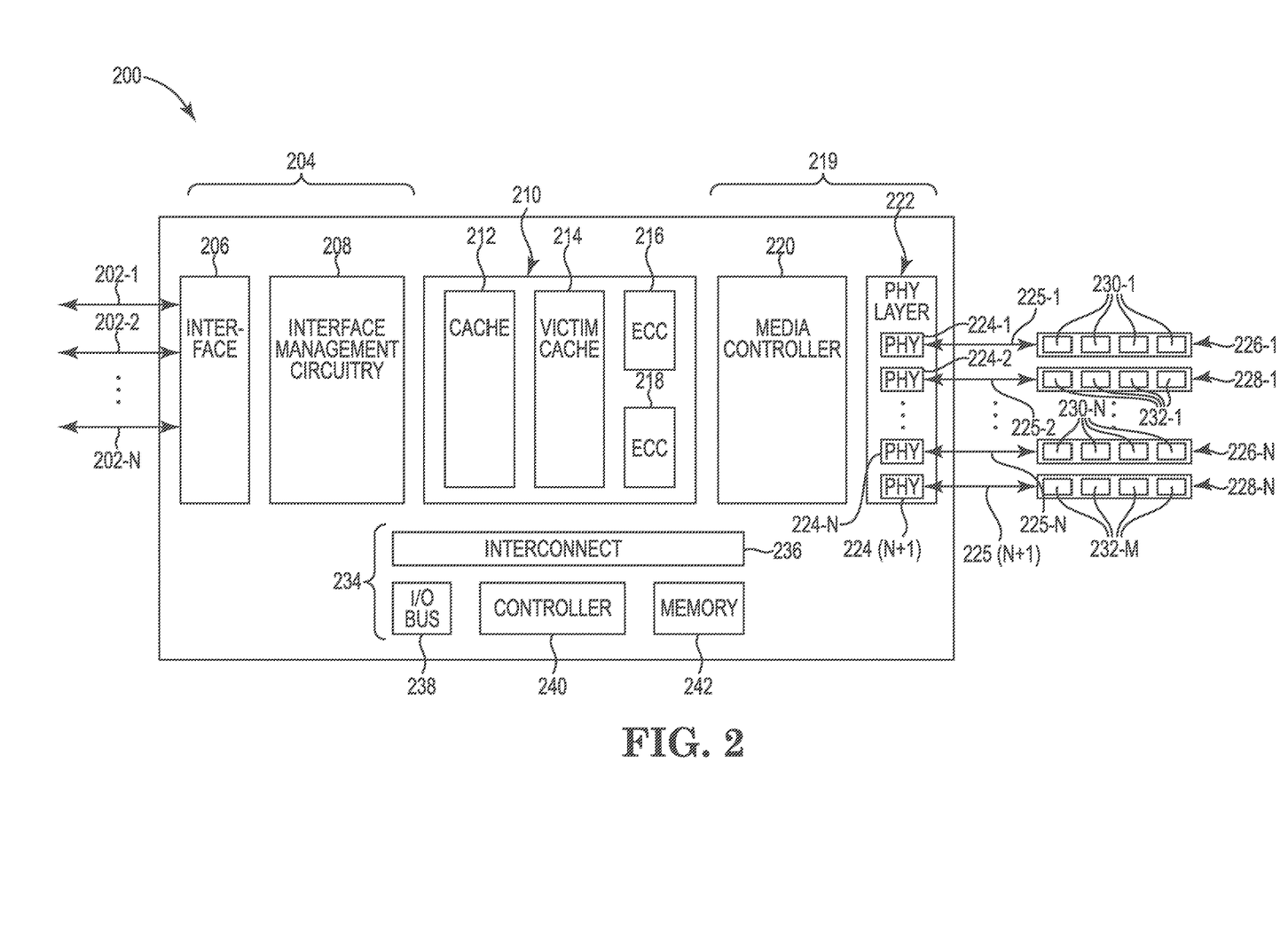
FIG. 2 illustrates a functional block diagram in the form of a controller for row hammer mitigation using a victim cache in accordance with a number of embodiments of the present disclosure.

The central controller portion 110 can include one or more caches (e.g., the cache 212 and/or the victim cache 214 illustrated in FIG. 2, herein) to store data associated with performance of a memory operation and/or a security component to encrypt data before the data is stored in the memory device 126, the memory device 128, and/or the one or more caches. Examples of the security component can include, but are not limited to, software and circuitry configured to implement data encryption, data hashing, data masking, and data tokenization. In some embodiments, in response to receiving a request from the host 103, data from the host 103 can be stored in cache lines of the cache and/or in cache lines of the victim cache, as described herein. The data in the cache and/or the victim cache can, at some point in time, be written to a memory device 126, 128. In some embodiments, the data can be encrypted using an Advanced Encryption Standard (AES) encryption before the data is stored in the cache and/or the victim cache.

The central controller portion 110 can include error correction code (ECC) encoding circuitry (e.g., the ECC encoding circuitry 216 illustrated in FIG. 2, herein) to ECC encode the data and ECC decoding circuitry (e.g., the ECC decoding circuitry 218 illustrated in FIG. 2, herein) to ECC decode the data. As used herein, the term "ECC encoding" can refer to encoding data by adding redundant bits to the data. The encoding, in general, could also be non-systematic. Therefore, the encoder can generally map the data vector of k bits in a codeword composed on n (>k) bits without an explicit separation between original data and parity bits. As used herein, the term "ECC decoding" can refer to examining the ECC encoded data to check for any errors in the data. In general, the ECC can not only detect the error but also can correct a subset of the errors it is able to detect. The ECC encoding circuitry can encode data that will be written to the memory device 126 and the memory device 128. In some embodiments, an error detected in the data can be corrected immediately upon detection. The ECC decoding circuitry can decode data that has been previously ECC encoded.

In some embodiments, the memory controller 100 can comprise a back end portion 119 comprising a media controller and a physical (PHY) layer that couples the memory controller 100 to a plurality of memory ranks. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125-1, 125-2. As used herein, the term "memory ranks" generally refers to a plurality of memory chips (e.g., memory dice) that can be accessed simultaneously. In some embodiments, the channel 125 may have a sixteen (16)-bit data bus. If there are four 16-bit memory chips connected to the channel 125, each memory chip may correspond to a memory rank. In these embodiments, there may be four (4) memory ranks. In some embodiments, the four memory chips may be eight (8)-bit memory chips instead of 16-bit memory chips. In these embodiments, two memory chips may be combined to form a 16-bit channel and result in the four memory chips forming two memory ranks. Read and write commands may not be executed concurrently in different memory ranks because the read commands and the write commands may use the data channel which is shared in a multi-rank memory topology. In some embodiments, a page size of a first type of memory device (e.g., the memory device 126) can be larger than a page size of the second type of memory device (e.g., the memory device 128).

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller 100, and a management unit memory to store data associated with initializing, configuring, and/or monitoring the characteristics of the memory controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

FIG. 2 illustrates a functional block diagram in the form of a memory controller 200 for row hammer mitigation using a victim cache in accordance with a number of embodiments of the present disclosure. A memory controller 200 is configured to manage a first type of memory device (e.g., the memory devices 226-1, . . . , 226-N, which can individually or collectively referred to as the first type of memory device 226) and a second type of memory device (e.g., the memory devices 228-1, . . . , 228-N, which can be individually or collectively referred to as the second type of memory device 228).

As shown in FIG. 2, a front end portion 204 can include an interface 206 that includes multiple I/O lanes 202-1, 202-2, . . . , 202-N (individually or collectively referred to as I/O lanes 202), as well as circuitry 208 to manage the interface 206. The interface 206 can be a peripheral component interconnect express (PCIe) 5.0 interface coupled to the I/O lanes 202. In some embodiments, the memory controller 200 can receive access requests involving at least one of the cache 212, the victim cache 214, the memory device 226, and/or the memory device 228 via the PCIe 5.0 interface 206 according to a CXL protocol. The interface 206 can receive data from a host (e.g., the host 103 shown in FIG. 1) through the of I/O lanes 202. The interface management circuitry 208 may use CXL protocols to manage the interface 206.

The central controller portion 210 can be configured to cause performance of an operation to mitigate a row hammer attack. For example, the central controller portion 210 can include the cache 212 to store data associated with performance of the memory operation and the victim cache 214 to store cache lines that are evicted from the cache 212. As used herein, the term "victim cache" generally refers to a hardware cache designed to decrease conflict misses and improve hit latency for direct-mapped caches. It is employed at the refill path of a Level 1 cache (e.g., the cache 212), such that cache lines that are evicted from the cache 212 are cached in the victim cache 214.

In some embodiments, data is written to the cache 212 where it is organized according to a least recently used (LRU) caching policy. In contrast to some approaches in which the evicted cache line would be written to the memory device 226 and/or the memory device 228, in embodiments herein, as a least recently used cache line is evicted from the cache 212 it is written to the victim cache 214. It is noted that the victim cache 214 may also be organized according to a LRU caching policy.

By writing cache lines that are evicted from the cache 212 to the victim cache 214 utilizing a LRU caching policy, an amount of time that the data written to the cache lines of the cache 212 and/or the victim cache 214 can be increased, thereby providing mitigation for row hammer attacks. Stated alternatively, because many conventional row hammer attacks are employed by quickly and repeatedly accessing (e.g., "thrashing") memory locations that store data, by moving data (e.g., cache lines) from the cache 212 to the victim cache 214 according to a LRU caching policy it is possible to reduce the likelihood of a successful row hammer attack being carried out.

In some embodiments, the cache 212 can be a set-associative cache including multiple cache lines; however, embodiments are not so limited, and in some embodiments, the cache 212 can be a direct mapped cache including multiple cache lines. In contrast, the victim cache 214 can be a fully associative cache including multiple cache lines. In general, however, the victim cache 214 contains fewer cache lines than the cache 212.

In some embodiments, the cache line size of the cache 212 and/or the cache 214 can be equal to or greater than the memory controller 200 access granularity (64 byte). For example, each cache line can include 256 bytes of data. In some embodiments, each cache line can comprise 512 bytes of data, although embodiments are not so limited. In general, read and write requests of CXL memory systems can be 64 bytes in size. Therefore, data entries in the cache 212 can, in some embodiments, have 64 bytes of data. Each cache line can comprise 256 bytes. Therefore, multiple 64-byte requests can be stored in each cache line. In response to a request from the host, the memory controller 200 can write 256 bytes of data to the cache 212, which can later be written to the victim cache 214, as described herein. In some embodiments, the 256 bytes of data can be written to the cache 212 and/or to the victim cache 214 in 64-byte chunks, although embodiments are not so limited.

In a non-limiting example, an apparatus (e.g., the memory system 101 illustrated in FIG. 1) includes a controller such as the central controller 210. A first cache (e.g., the cache 212) and a second cache (e.g., the victim cache 214) can be coupled to the controller 210. As described herein, the first cache and/or the second cache can operate according to a LRU scheme. That is, the first cache (e.g., the cache 212) and/or the second cache (e.g., the victim cache 214) can utilize a LRU caching policy.

A memory device (e.g., the memory device(s) 226 and/or the memory device(s) 228) is coupled to the first cache and/or the second cache via at least one memory channel (e.g., at least one memory channel of the channels 225). In this example, the controller (e.g., the central controller 210) can control writing of data to cache lines of the first cache and control writing of a least recently used cache line of the first cache to the second cache as part of a row hammer mitigation operation, as described herein. In some embodiments, as shown in FIG. 2, the first cache and the second cache are resident on the central controller portion 210 of the memory controller 200.

As mentioned above, the first cache can be larger than the second cache. For example, the second cache can include at least 256 cache lines, and the first cache can include at least twice as many cache lines as the second cache (e.g., 512 cache lines or greater). Embodiments are not so limited; however, provided that the first cache contains a greater quantity of cache lines than the second cache. Embodiments are contemplated wherein the first cache contains 256 cache lines and the second cache contains 128 cache lines. Similarly, embodiments are contemplated wherein the first cache contains 2,048 cache lines and the second cache contains 256 cache lines. Accordingly, it will be appreciated that the quantity of cache lines associated with the first cache and the second cache are arbitrary except for the condition that, in general, the second cache includes fewer cache lines than the first cache.

Further, as shown in FIG. 2, in some embodiments, the first cache is physically distinct from the second cache. For example, in some embodiments, the first cache and the second cache are deployed as separate integrated circuit components (e.g., substrates, ASICs, FPGAs, etc.) that can be communicatively coupled to one another. As another example, in some embodiments, the first cache and the second cache can be independently addressable and/or accessible by the controller.

As described above, the controller can be a central controller portion 210 of a memory controller 200 that is configured to operate according to a Compute Express Link protocol. As such, in some embodiments, the controller can be configured to cause the data to be written to the first cache at a rate of at least 32 gigatransfers per second. Embodiments are not so limited; however, and in some embodiments, the controller can be configured to match a latency of the second cache to a latency of the at least one memory channel 225 coupling the first cache or the second cache, or both, to the memory device(s) 226, 228. In such embodiments, the latency between the first cache and/or the second cache may be reduced to elongate an amount of time between potential memory accesses, thereby further reducing the likelihood of a successful row hammer attack being carried out.

Continuing with this non-limiting example, the first cache can be a direct mapped cache or a set-associative cache, as described above, while the second cache can be a fully associative cache. Due to the costs (e.g., power consumption, bandwidth, physical space, etc.) of providing fully associative caches throughout the memory controller 200, aspects of the present disclosure provide that the second cache (e.g., the victim cache 214) is a fully associative cache while the first cache (e.g., the cache 212) is a direct mapped cache or a set-associative cache. By providing the fully associative victim cache(s) in connection with a direct mapped cache or a set-associative cache, row hammer attack may be mitigated, as described herein.

In some embodiments, the controller can determine that a least recently used cache line from the second cache is not to be written to the memory device and write the least recently used cache line of the second cache back to the second cache. For example, if it is determined that the least recently used cache line is not to be evicted to the memory, the least recently used cache line can be maintained in the second cache, refreshed, or re-written to the second cache such that it would become the most recently used cache line of the second cache.

In another non-limiting example, a system (e.g., the memory system 101 illustrated in FIG. 1), includes a memory controller 200 that includes a central controller 210, a first cache (e.g., the cache 212) comprising a first quantity of cache lines that is resident on the central controller 210. The system further includes a second cache (e.g., the victim cache 214) comprising a second quantity of cache lines that is resident on the central controller 210. As discussed herein, the first cache can be a direct mapped cache or a set-associative cache, while the second cache can be a fully associative cache. Further, in some embodiments, the second cache includes a lesser quantity of cache lines than the first cache. In this example, the memory controller 200 can further be coupled to a memory device (e.g., one or more of the memory devices 126, 226 and/or one of the memory devices 128, 228 illustrated in FIGS. 1 and 2, herein).

The memory controller 200 and/or the central controller 210 can cause data to be written to the first cache according to a Compute Express Link (CXL) protocol. For example, the memory controller 200 and/or the central controller 210 can be configured to cause the data to be written to the first cache at a rate of at least 32 gigatransfers per second. In some embodiments, the memory controller 200 and/or the central controller 210 can cause a least recently used cache line of the first cache to be written to the second cache as part of a row hammer mitigation operation. In some embodiments, the first cache and/or the second cache can operate according to a least recently used (LRU) caching policy to enable writing (e.g., evicting) the least recently used cache line of the first cache to the second cache and/or writing of least recently used cache lines of the second cache to a different location within the system.

For example, in some embodiments, the memory controller 200 and/or the central controller 210 can determine that a least recently used cache line from the second cache is not to be written to the memory device and write the least recently used cache line of the second cache to the first cache or the second cache. For example, if it is determined that the least recently used cache line is not to be evicted to the memory, the least recently used cache line can be maintained in the second cache, refreshed, or re-written to the second cache such that it would become the most recently used cache line of the second cache.

In some embodiments, the memory controller 200 and/or the central controller 210 can utilize an instruction level parallelism (ILP) scheme to cause the data to be written to the first cache and/or the second cache. Embodiments are not so limited; however, and in some embodiments, the memory controller 200 and/or the central controller 210 can utilize a memory-level parallelism (MLP) scheme to cause the data to be written to the first cache and/or the second cache. As used herein, the term "instruction level parallelism" or "ILP," generally refers to the parallel or concurrent execution of a sequence of instructions in the memory system or in a computing system in which the memory system is deployed. ILP is generally distinguished from "concurrency" inasmuch as ILP generally operates on a single thread of a process executed by the computing system. Further, as used herein, the term "memory-level parallelism" or "MLP," generally refers to the ability to have multiple memory operations, in particular cache misses and/or translation lookaside buffer (TLB) misses, concurrently pending in the memory system or in a computing system in which the memory system is deployed.

Continuing with this non-limiting example, the memory controller 210 can perform operations to match a latency of the second cache to a latency of a memory channel (e.g., the channels 225) coupling the memory controller 210 to the memory device. For example, as described herein, the latency between the first cache and/or the second cache may be reduced to elongate an amount of time between potential memory accesses, thereby further reducing the efficacy of a possible row hammer attack.

As shown in FIG. 2, a central controller portion 210 can include a security component 214 to encrypt data before storing the data in the memory device 226 and/or the memory device 228 and decrypt the data before the data is transferred to the cache 212. The data can be transferred from the cache 212 and/or from the victim cache 214 to the memory device 226 and/or the memory device 228. As stated before, the security component 214 can use an AES encryption to encrypt the data. In some embodiments, the security component 214 may encrypt data that is written to the memory device 228 but may not encrypt the data that is written to the memory device 226. The data written to the memory device 228 may be encrypted because the memory device 228 can have security deficiencies that the memory device 226 does not have. The security component 214 can be bypassed when it is not used, such as when data is being written to the memory device 226. In some embodiments, the security component 214 can be enabled or disabled. For example, the security component 214 can be enabled when writing memory to a persistent memory device, such as the memory device 228.

As shown in FIG. 2, the central controller portion 210 can include error correction code (ECC) circuitry to ECC encode the data and ECC decode the data. In some embodiments, the memory controller 210 can implement low power chip kill (LPCK) error correction. As used herein, the term "chip kill" generally refers to a form of error correction that protects memory systems (e.g., the memory system 101 shown in FIG. 1) from any single memory chip failure as well as multi-bit error from any portion of a single memory chip. In some embodiments, the LPCK circuitry can increase the stability of the data and correct errors in the data. One approach for chip kill protection is on-the-fly correction implementation. On-the-fly correction can form a plurality of codewords out of four (4)-bit symbols of each of a plurality of memory dice. For example, if there are eleven (11) dice each containing 4 separate bit symbols, with each bit symbol containing 4 bits, the 11 die can form 4 codewords each with 11 separate bit symbols comprising a total of forty four (44) bits per codeword.

In some embodiments, a first codeword can comprise the first bit symbol of each die, a second codeword can comprise the second bit symbol of each die, a third codeword can comprise the third bit symbol of each die, and a fourth codeword can comprise the fourth bit symbol of each die. In other words, the eight data bit symbols and 3 parity bit symbols of a codeword can be stored in eleven (11) die. Eight (8) of the 11 die can contain data bit symbols and the three (3) remaining die of the 11 die can contain parity bit symbols. Adding 3 parity bit symbols can allow the central controller portion 210 to correct up to one symbol error in each codeword and to detect up to two symbol errors. If instead of adding 3 parity bit symbols, only two (2) parity bits are added, the central controller portion 210 can correct up to one symbol error but only detect one symbol error. In some embodiments, the data bit symbols and the parity bit symbols can be written or read concurrently from the 11 die by the ECC encoding circuitry 216 and the ECC decoding circuitry 218. If every bit symbol in a die fails, only the bit symbols from that die in the codeword will fail. This allows memory contents to be reconstructed despite the complete failure of one die.

As shown in FIG. 2, the memory controller 200 can include a back end portion 219, including a media controller portion 220 comprising a plurality of media controllers and a physical (PHY) layer portion 222 comprising a plurality of PHY layers 224-1, 224-2, 224-N, . . . , 224-(N+1) (individually or collectively referred to as PHY layer 224). In some embodiments, the back end portion 219 is configured to couple the PHY layer portion 222 to a plurality of memory ranks 230-1, . . . , 230-N (individually or collectively referred to as memory ranks 230) of a first memory device 226 and a plurality of memory ranks 232-1, . . . , 232-M (individually or collectively referred to as memory ranks 232) of a second memory device 228-1, . . . , 228-N (individually or collectively referred to as second memory device 228). The media controller 220 can include both open-page policies and a closed-page policies. As used herein, the term "open-page policy" generally refers to a policy which allows a memory controller (e.g., media controller 220) to leave a page of memory open for a certain amount of time after a read operation or a write operation is performed. As used herein, the term "closed-page policy" generally refers to a policy that ensures that a page of memory is closed immediately after a read operation or a write operation is performed. In some embodiments, the FeRAM memory device 228 can implement a closed-page policy with an additional requirement that the tRAS and other timings of the FeRAM memory device 228 are different from DRAM timings.

In embodiments where LPCK error correction is used, the media controller portion 220 can be a single media controller 220. When implementing LPCK error correction, a plurality of channels 225-1, 225-2, 225-N, . . . , 225-(N+1) (individually or collectively referred to as the plurality of channels 225) can be driven concurrently to write data to the DRAM memory device 226 and/or the FeRAM memory device 228. In some embodiments, instead of using a single media controller 220, multiple media controllers can be used to drive the plurality of channels 225 in the LPCK architecture. When multiple media controllers are used to drive the channels 225 concurrently, the media controllers are utilized substantially simultaneously.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

Each of the plurality of media controllers can receive a same command and address and drive the plurality of channels 225 substantially simultaneously. By using the same command and address for the plurality of media controllers, each of the plurality of media controllers can utilize the plurality of channels 225 to perform the same memory operation on the same plurality memory cells.

A back end portion 222 can include multiple PHY layers 224 and the media controller portion 220 that is configured to drive the channels 225 that couple PHY layers 224 to the memory ranks 230, 232. In some embodiments, the memory ranks 230, 232 can be DRAM memory ranks 230 and/or FeRAM memory ranks 232. In some embodiments, the memory controller 200 can be coupled to the memory ranks 230, 232 through channels 225 coupled to the back end portion 219 and each of the channels 225 is coupled to four (4) memory ranks 230, 232.

The memory controller 200 can include a management unit 234 configured to initialize, configure, and/or monitor characteristics of the memory controller 200. In some embodiments, the management unit 234 includes an I/O bus 238 to manage out-of-band data and/or commands, a management unit controller 240 to execute instructions associated with initializing, configuring, and/or monitoring the characteristics of the memory controller 200, and a management unit memory 242 to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 or a temperature measured by an external sensor, or both. Further, the management unit 234 can include an advanced high-performance bus (AHB) interconnect 236 to couple different components of the management unit 234.

As stated above, the I/O bus 238 can be configured to transfer out-of-band data and/or commands. In some embodiments, the I/O bus 238 can be a System Management Bus (SMBus). As used herein, the term "SMBus" generally refers to a single-ended simple two-wire bus for the purpose of lightweight communication. Further, the management unit 234 can include circuitry to manage in-band data. As used herein, the term "in-band data" generally refers to data that is transferred through the main transmission medium within a network, such as a local area network (LAN).

The management unit 234 can include a management unit controller 240. In some embodiments, the management unit controller 240 can be a controller that meets the Joint Test Action Group (JTAG) standard and operate according to an Inter-Integrate Circuit ($I^2C$ or $I^3C$) protocol, and auxiliary I/O circuitry. As used herein, the term "JTAG" generally refers to an industry standard for verifying designs and testing printed circuitry boards after manufacture. As used herein, the term "$I^2C$" generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the management unit memory 242. In some embodiments, the management unit memory 242 can be a flash memory such as flash NOR memory or other persistent flash memory device.

Figure 3:
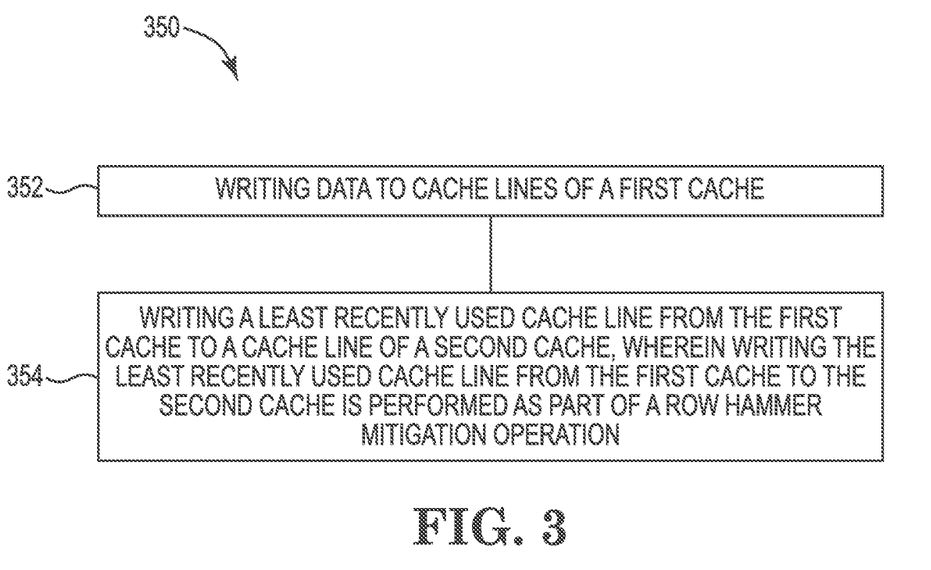
FIG. 3 is a flow diagram corresponding to an example method for row hammer mitigation using a victim cache in accordance with a number of embodiments of the present disclosure.

FIG. 3 is a flow diagram corresponding to an example method 350 for row hammer mitigation using a victim cache in accordance with a number of embodiments of the present disclosure The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 352, the method 350 includes writing data to cache lines of a first cache. The first cache can be analogous to the cache 212 illustrated in FIG. 2, herein. Accordingly, in some embodiments, the method 350 can include writing the data to the cache lines of the first cache according to a compute express link (CXL) protocol, as described herein.

At operation 354, the method 350 includes writing a least recently used cache line from the first cache to a cache line of a second cache. The second cache can be analogous to the victim cache 214 illustrated in FIG. 2, herein. As described herein, the first cache can comprise a greater quantity of cache lines than the second cache. In some embodiments, writing the least recently used cache line from the first cache to the second cache is performed as part of a row hammer mitigation operation.

As described herein, in some embodiments, the first cache is a direct mapped cache or a set associative cache and the second cache is a fully associative cache. Further as described herein, the first cache and the second cache can each operate according to a least recently used (LRU) caching policy. As discussed above, operating the first cache and/or the second cache according to a LRU caching policy can ensure that cache lines that are evicted from the first cache and/or the second cache have been accessed less frequently than other cache lines of the first cache and/or the second cache thereby facilitating improved row hammer attack mitigation.

The method 350 can further include matching a latency of the second cache to a latency a of channel coupling the first cache and/or the second cache to a memory device (e.g., the memory devices 126, 226 and/or 128, 228 illustrated in FIGS. 1 and 2, herein). In some embodiments, the channel can be analogous to one of the channels 125, 225 illustrated in FIGS. 1 and 2, herein. By matching the latency of the second cache to the latency a of channel coupling the first cache and/or the second cache to the memory device improved row hammer mitigation can be provided at least because increasing the latency of the first cache and/or the second cache can further increase an amount of time available to perform row hammer attacks, such as thrashing of the cache(s). Further, because the latency of the channel(s) coupling the first cache and/or the second cache to the memory device can represent a bottleneck in data accesses (e.g., can represent a bottleneck in retrieving data from the memory device(s)), a user of the computing systems described herein is unlikely to experience any perceivable delays in data access when embodiments of the present disclosure are implemented.

The method 350 can further include determining that a least recently used cache line from the second cache is not to be written to a memory device coupled to the first cache or the second cache, or both and writing the least recently used cache line of the second cache back to the second cache.

Figure 4:
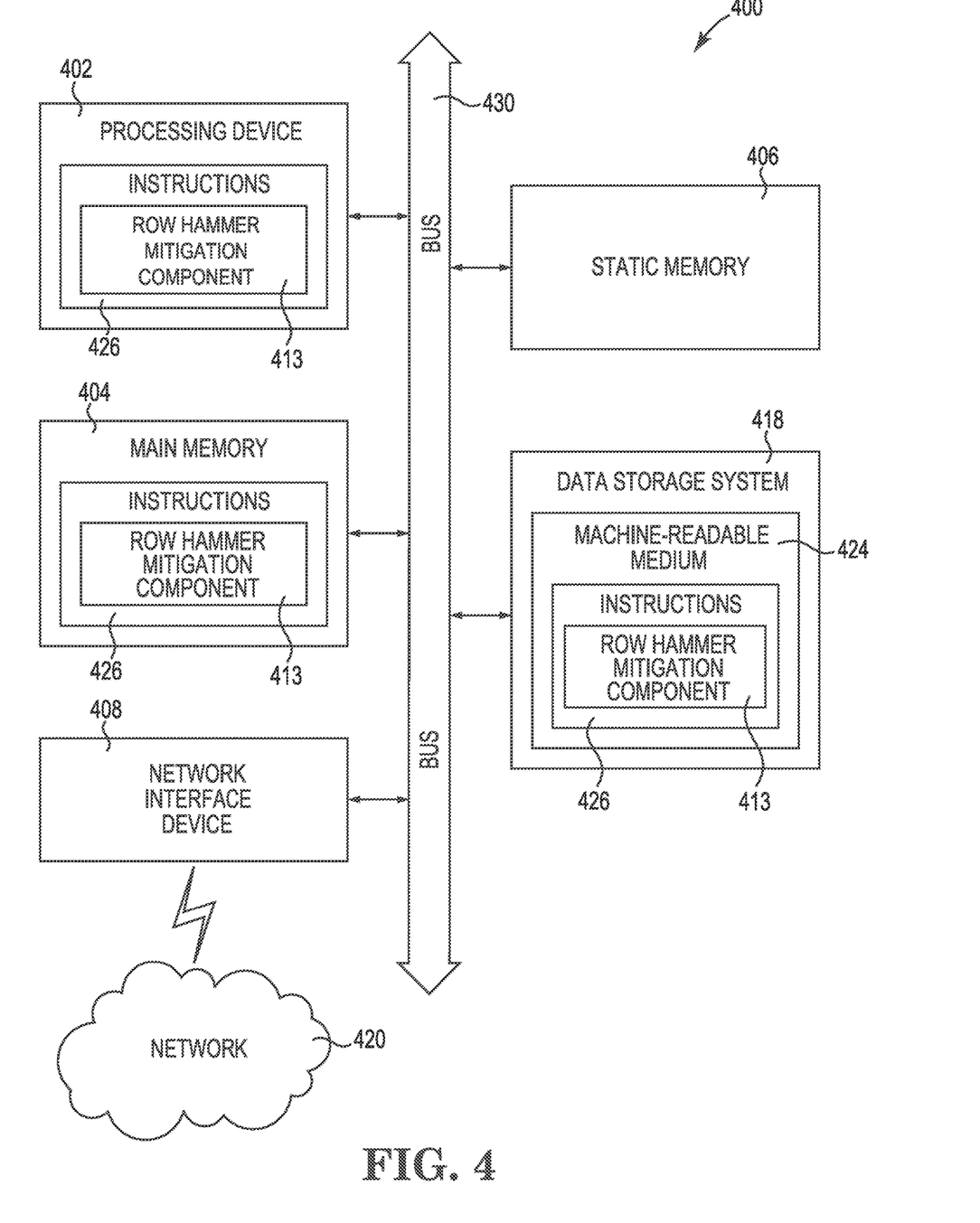
FIG. 4 is a block diagram of an example computer system in which embodiments of the present disclosure may operate.

FIG. 4 is a block diagram of an example computer system 600 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a row hammer mitigation component 413 (e.g., to perform the operations of the central controller 110 of FIG. 1 and/or the central controller 210 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a row hammer mitigation component 413 (e.g., the central controller 110 of FIG. 1 and/or the central controller 210 of FIG. 2 and/or constituent components thereof). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of cache lines) can refer to one or more cache lines, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

What is claimed is:

1. A method, comprising:

writing data to cache lines of a first cache; and performing a row hammer mitigation operation by writing a least recently used cache line from the first cache to a cache line of a second cache; and writing a least recently used cache line from the second cache back to the second cache.

2. The method of claim 1, wherein:

the first cache is a set associative cache, and the second cache is a fully associative cache.

3. The method of claim 1, wherein the first cache and the second cache each operate according to a least recently used (LRU) caching policy.

4. The method of claim 1, further comprising:

determining that a least recently used cache line from the second cache is not to be written to a memory device coupled to the first cache or the second cache, or both.

5. The method of claim 1, further comprising writing the data to the cache lines of the first cache according to a compute express link (CXL) protocol.

6. The method of claim 1, wherein the first cache comprises a greater quantity of cache lines than the second cache.

7. An apparatus, comprising:
a controller;
a first cache coupled to the controller, the first cache configured to operate according to a least recently used (LRU) scheme;
a second cache coupled to the controller, the second cache configured to operate according to a LRU scheme; and
a memory device coupled to the first cache or the second cache, or both via at least one memory channel, wherein the controller is configured to:
control writing of data to cache lines of the first cache; and
control writing of a least recently used cache line of the first cache to the second cache to perform a row hammer mitigation operation; and
control writing of a least recently used cache line from the second cache back to the second cache.

8. The apparatus of claim 7, wherein the controller comprises a central controller portion of a memory controller that is configured to operate according to a Compute Express Link protocol.

9. The apparatus of claim 8, wherein the first cache and the second cache are resident on the central controller portion of the memory controller.

10. The apparatus of claim 7, wherein the second cache comprises at least 256 cache lines, and wherein the first cache contains at least twice as many cache lines as the second cache.

11. The apparatus of claim 7, wherein:
the first cache is a set associative cache, and
the second cache is a fully associative cache.

12. The apparatus of claim 7, wherein the controller is further configured to:
determine that a least recently used cache line from the second cache is not to be written to the memory device.

13. The apparatus of claim 7, wherein the first cache is physically distinct from the second cache.

14. A system, comprising:
a memory controller comprising:
a central controller;
a first cache comprises a first quantity of cache lines resident on the central controller;
a second cache comprising a second quantity of cache lines resident on the central controller; and
a memory device coupled to the memory controller, wherein the memory controller is configured to:
cause data to be written to the first cache according to a Compute Express Link (CXL) protocol; and
cause a performance of a row hammer mitigation operation that includes writing a least recently used cache line of the first cache to the second cache;
cause a least recently used cache line from the second cache to be written back to the second cache.

15. The system of claim 14, wherein:
the first cache is a set associative cache, and
the second cache is a fully associative cache.

16. The system of claim 14, wherein the first cache or the second cache, or both are configured to operate according to a least recently used caching policy.

17. The system of claim 14, wherein the second cache comprises a lesser quantity of cache lines than the first cache.

18. The system of claim 14, wherein the memory controller is configured to utilize an instruction level parallelism scheme to cause the data to be written to the first cache.

19. The system of claim 14, wherein the memory controller is further configured to:
determine that a least recently used cache line from the second cache is not to be written to the memory device.

20. The system of claim 14, wherein the memory controller is configured to cause the data to be written to the first cache at a rate of at least 32 gigatransfers per second.

* * * * *